(12) United States Patent
Lemus Martin et al.

(10) Patent No.: US 9,725,169 B2
(45) Date of Patent: Aug. 8, 2017

(54) POWER MANAGEMENT METHOD AND SYSTEM FOR AN UNMANNED AIR VEHICLE

(71) Applicant: The Boeing Company, Chicago, IL (US)

(72) Inventors: Jose Luis Lemus Martin, Madrid (ES); Sergio Pereira Mayan, Madrid (ES); Eduardo Gabriel Ferreyra, Madrid (ES)

(73) Assignee: The Boeing Company, Chicago, IL (US)

( * ) Notice: Subject to any disclaimer, the term of this patent is extended or adjusted under 35 U.S.C. 154(b) by 199 days.

(21) Appl. No.: 14/447,090

(22) Filed: Jul. 30, 2014

(65) Prior Publication Data

US 2015/0314869 A1 Nov. 5, 2015

(30) Foreign Application Priority Data

Sep. 26, 2013 (EP) .................................. 13382370

(51) Int. Cl.
*G05B 13/02* (2006.01)
*B64C 39/02* (2006.01)
(Continued)

(52) U.S. Cl.
CPC ............ *B64C 39/024* (2013.01); *B64D 31/14* (2013.01); *B64D 41/00* (2013.01);
(Continued)

(58) Field of Classification Search
None
See application file for complete search history.

(56) References Cited

U.S. PATENT DOCUMENTS 7,339,353 B1* 3/2008 Masias ...................... H02J 1/10
320/138
7,689,337 B2* 3/2010 Post, II ................ B60G 17/018
701/1
(Continued)

FOREIGN PATENT DOCUMENTS

DE 19836842 A1 2/2000
GB 2462452 A 2/2010

OTHER PUBLICATIONS

Li et al., Power management and economic estimation of fuel cell hybrid vehicle using fuzzy logic, 2009 IEEE.

*Primary Examiner* — Truc M Do
*Assistant Examiner* — Jess Whittington
(74) *Attorney, Agent, or Firm* — Duft Bornsen & Fettig LLP

(57) ABSTRACT

Power management method and system for an unmanned air vehicle, wherein the unmanned air vehicle comprises a plurality of power demanding subsystems and a plurality of power sources. The invention establishes mission oriented fixed parameters. A fuzzy logic power management unit, comprised in the system, automatically calculates and assigns priorities for delivering power to the subsystems. It also automatically calculates and assigns amounts of power delivered to each subsystem and automatically decides which of the power sources to deliver power to which subsystem. The fuzzy logic power management system calculates and assigns the priorities and loads in function of a plurality of internal variables, external variables and the mission oriented fixed parameters.

3 Claims, 3 Drawing Sheets

(51) Int. Cl.
*B64D 31/14* (2006.01)
*B64D 41/00* (2006.01)
*G05D 1/00* (2006.01)

(52) U.S. Cl.
CPC ....... *G05B 13/0275* (2013.01); *G05D 1/0005* (2013.01); *B64C 2201/06* (2013.01); *B64C 2201/141* (2013.01); *B64D 2041/005* (2013.01); *B64D 2211/00* (2013.01); *B64D 2221/00* (2013.01); *Y02T 90/36* (2013.01)

(56) References Cited

U.S. PATENT DOCUMENTS

| | | | |
|---|---|---|---|
| 7,979,173 B2 | 7/2011 | Breed | |
| 8,260,477 B2 | 9/2012 | Almalki et al. | |
| 8,359,133 B2 | 1/2013 | Yu et al. | |
| 8,373,581 B2 | 2/2013 | Hassan et al. | |
| 2009/0143926 A1 | 6/2009 | Almalki et al. | |
| 2010/0017249 A1* | 1/2010 | Fincham | B60L 3/12 705/412 |
| 2010/0312388 A1* | 12/2010 | Jang | G06Q 10/0631 700/248 |
| 2011/0178648 A1* | 7/2011 | Calvignac | F01D 15/10 700/291 |
| 2011/0269491 A1* | 11/2011 | Eberhart | G06N 3/126 455/509 |
| 2012/0095612 A1* | 4/2012 | Rivers, Jr. | H02J 3/14 700/297 |
| 2012/0208672 A1* | 8/2012 | Sujan | B60W 10/02 477/5 |
| 2014/0103158 A1* | 4/2014 | Berry | B64C 29/0025 244/2 |
| 2014/0200723 A1* | 7/2014 | Roy | G06Q 50/06 700/291 |

* cited by examiner

POWER MANAGEMENT METHOD AND SYSTEM FOR AN UNMANNED AIR VEHICLE

CROSS-REFERENCE TO RELATED APPLICATION

The present application is based on and claims the benefit of priority of European Patent Application No. EP13382370.8, filed on Sep. 26, 2013, the contents of which are incorporated herein by reference in entirety.

OBJECT OF THE INVENTION

The present invention relates to a power management method and system for Unmanned Air Vehicles (UAVs). These UAVs are used for many different tasks that require specific mission-oriented power management. Whenever the aircraft features multiple available energy sources (i.e., a fuel cell, different sets of batteries, a photovoltaic panel or a regenerative windmilling system) decisions concerning the amount of power delivered to the different electronic subsystems and which of those sources will deliver energy to which subsystem have to be optimized for each specific mission. This task can become impossible for a remote human controller or pilot to fulfill. An improper electrical power management could lead into an inefficient flight, wasted energy or worse, failure to complete a mission. The proposed solution is based on a power management system that takes into account all the variables of the plane (including its efficiency and flight limits) and uses fuzzy logic to take decisions related with the power consumption which are not only better for the optimization of the mission but also closer to how a human would behave in the same situation. As a result, the system can relieve the workload of the human controller or pilot and also evaluate the feasibility of the mission.

BACKGROUND OF THE INVENTION

Fuzzy logic is widely used for many applications in the state of the art and especially in machine control applications. Patent document U.S. Pat. No. 8,373,581 describes a mobile control node system and method for vehicles that mentions the use of fuzzy logic as an alternative to the estimators and filters that this kind of inventions usually use. However the use of the fuzzy logic technology is only superficially mentioned and not deeply disclosed.

Patent document U.S. Pat. No. 8,359,133 discloses an engine power elevation and active battery charge energy management strategies for plug-in hybrid electric vehicles. This invention also mentions the use of fuzzy logic as a controller type for the battery SOC level. Fuzzy logic is mentioned as a possible decision technology for the strategy to manage the battery, but this technology is not deeply discussed.

Patent document U.S. Pat. No. 8,260,477 discloses a method and apparatus for tracking the center of gravity of air vehicles that uses fuzzy decision rules to obtain an improved estimate of position and center of gravity variables. The invention only mentions fuzzy logic as a possible decision technology for the estimation of the center of gravity.

Patent document U.S. Pat. No. 7,979,173 describes an autonomous vehicle travel control systems and methods that employ fuzzy systems to replace operator decisions as they tend to make errors in critical conditions. Fuzzy logic is used as a method to avoid human operator errors, which is a common feature with the present invention, but it is focused in steering and travel control application, which is a totally different approach to that contained in this document.

The document "Power management and economic estimation of fuel cell hybrid vehicle using fuzzy logic" (Xiangjun Li et al) describes a fuzzy system for improving the power efficiency in a fuel cell propulsion vehicle. The use of fuzzy logic is restricted to its application in regenerative brakes. The chosen vehicle is terrestrial and the only thing in common with the present invention is the use of a fuel cell based propulsion system.

The technical problem faced by the present invention which is the management of the power sources of autonomous vehicles, and specifically of unmanned air vehicles, has been currently solved by:

On the ground by human controllers, such as remote control pilots and auxiliary personnel. Improperly trained pilots could make mistakes and even a well trained pilot cannot consider such many variables at the same time and act consequently;

Onboard by closed loop software, constantly revising prior decisions taking current situation into consideration which considerably reduces the efficiency of the power management process; and Onboard by a simple Power Management Unit that does not take any variable or mission goal into consideration which could lead into an inefficient flight, wasted energy or failure to complete a mission.

DESCRIPTION OF THE INVENTION

To achieve the objectives and avoid the drawbacks listed above, the present invention comprise a power management method and system for Unmanned Air Vehicles (UAVs) that take into account all the variables of the plane (including its efficiency and flight limits) and uses fuzzy logic to take decisions which are not only better for the optimization of the mission but also closer to how a human would behave in the same situation. It prevents the loss of unmanned aircrafts due to incorrect power dimensioning or unforeseen conditions. It removes the necessity of the pilot to control a large amount of variables, thus improving the reliability of the system by removing part of the Human Factor. It also optimizes the use of the resources on board contributing to a better mission performance.

Fuzzy logic uses a kind of reasoning closer to that of a human being, in which the decisions are taken when an event is likely to happen or is approximately happening rather than waiting for an absolute certainty. Compared to traditional Boolean logic, in which the only possible values are "True" 1 and "False" 0, fuzzy logic variables may have a truth value that ranges in degree between 0 and 1.

Fuzzy logic allows for approximate values and inferences as well as incomplete or ambiguous data (fuzzy data) as opposed to only relying on crisp data (binary yes/no choices). This is an example in which a human controller could make a critical error by simply not taking everything into account and how using a Fuzzy system simplifies that decision.

A first object of the present invention is a power management method for unmanned air vehicles. The method manages the electrical power distribution to a plurality of onboard subsystems of the UAV and it comprises the following steps:

enabling a processor comprising hardware and software utilizing a fuzzy logic algorithm. In the present document this processor is also called fuzzy logic power management unit; and, allocating electrical power to the unmanned air vehicle subsystems based on a plurality of fixed and variable flight parameters.

In a particular embodiment of the present invention, the unmanned air vehicle comprises at least an onboard subsystem selected between an instrumentation system, further including a plurality of antennas, and Baro/pitot; an autopilot system, further including control surfaces, inertial measurement units and autopilot controls; a GPS; an electronic speed control system; a propulsion system; a power system that comprises a plurality of power sources; and any combination thereof. Previously, there would be established the fixed flight parameters of the UAV which are a plurality of mission oriented fixed parameters. The processor, which implements the fuzzy logic, automatically calculates and assigns priorities for delivering power to the subsystems, automatically calculates and assigns amounts of power delivered to each subsystem and automatically decides which of the power sources deliver power to which subsystem. All the calculus, decisions and priority assignations made by the processor are taken in function of internal variables, external variables and the previously established mission oriented fixed parameters. The internal and external variables are the variable flight parameters of the UAV.

In other particular embodiment of the present invention, the method comprises at least the following steps:

measuring a plurality of internal variables of the unmanned air vehicle;

measuring a plurality of external variables to the unmanned air vehicle;

automatically calculate, by means of the processor, a first set of priorities for delivering power to the subsystems, a set of amounts of power delivered to each subsystem and a second set of priorities for deciding which of the power sources deliver power to which subsystem, in function of the internal variables, the external variables and the mission oriented fixed parameters; and, assigning the set of priorities and amounts to the subsystems and power sources.

In another embodiment of the invention, the internal variables are selected from a group comprising:

internal temperature of the propulsion system;
remaining load of the power sources;
availability of the plurality of power sources;
power requirements of the subsystems; or,
any combination thereof.

In another embodiment of the invention, the external variables are environmental variables which are selected from a group comprising air speed, air temperature, atmospheric pressure or any combination thereof.

In another embodiment of the invention, the mission oriented fixed parameters are selected from a group comprising distance to be traveled by the unmanned air vehicle, flight speed or any combination thereof.

A second object of the present invention is a power management system for unmanned air vehicles. The unmanned air vehicles comprise at least an onboard subsystem selected between an instrumentation system, further including a plurality of antenna, and Baro/pitot; an autopilot system, further including control surfaces, inertial measurement units and autopilot controls; a GPS; an electronic speed control system; a propulsion system; a power system that comprises a plurality of power sources; and any combination thereof. The power management system of the unmanned air vehicle may comprise any other kind of subsystem, as for example a payload, that requires significant power consumption and which may be also managed by the method object of the present invention.

Said power management system also comprises a processor comprising hardware and software utilizing a fuzzy logic algorithm, connected to the above mentioned onboard subsystems. The fuzzy logic power management unit further comprising decision-making functionalities for assigning priorities to loads of the subsystems and the power sources used in function of internal and external variables to optimize endurance and speed of the unmanned air vehicle.

In another embodiment of the invention, the propulsion system is selected from a set comprising engines, generators, electrical wiring bundles, inlet duct systems, shrouds, cowls, fuel tanks and propellers systems or any combination thereof.

In another embodiment of the invention, power system is selected from a set comprising a fuel cell, a main battery and a plurality of auxiliary batteries, solar panels, regenerative windmilling systems, super-capacitors or any combination thereof.

There are multiple novel features in the present disclosed invention related to the use of fuzzy logic in the control system of the UAVS, specifically:

the variables are evaluated automatically, instead of being taken into account by a human controller;

the use of fuzzy logic allows a more human-like behavior. It also improves efficiency by not having to check the state constantly in a loop;

the system and method herein disclosed are mission oriented, so they takes into account the goals and limitations of the mission to take its decisions.

Although in the UAVs the use of fuzzy logic is especially desirable as not always there is a human pilot commanding the airplane, the present invention is not limited to this kind of autonomous vehicles. This invention is also applicable to any other kind of air, maritime or land vehicles wherein the power management and the decision making must be made by means of fuzzy logic. In a commercial airplane the decision on whether to switch on the APU (auxiliary power unit) or not is taken by the pilot whereas using the power management system and method object of the present invention, the reliability of the plane could be improved. For example, in the case of motor failure, the power management unit could monitor the failure, the main batteries and decide whether to switch the APU on or not. This could remove the human factor in a particular case where the pilot's workload is high.

DESCRIPTION OF AN EXAMPLE OF EMBODIMENT OF THE INVENTION

Next, a description of an example of embodiment of the present invention is carried out, with illustrative character and without limitation, making reference to the numbering adopted in the figures.

Figure 1:
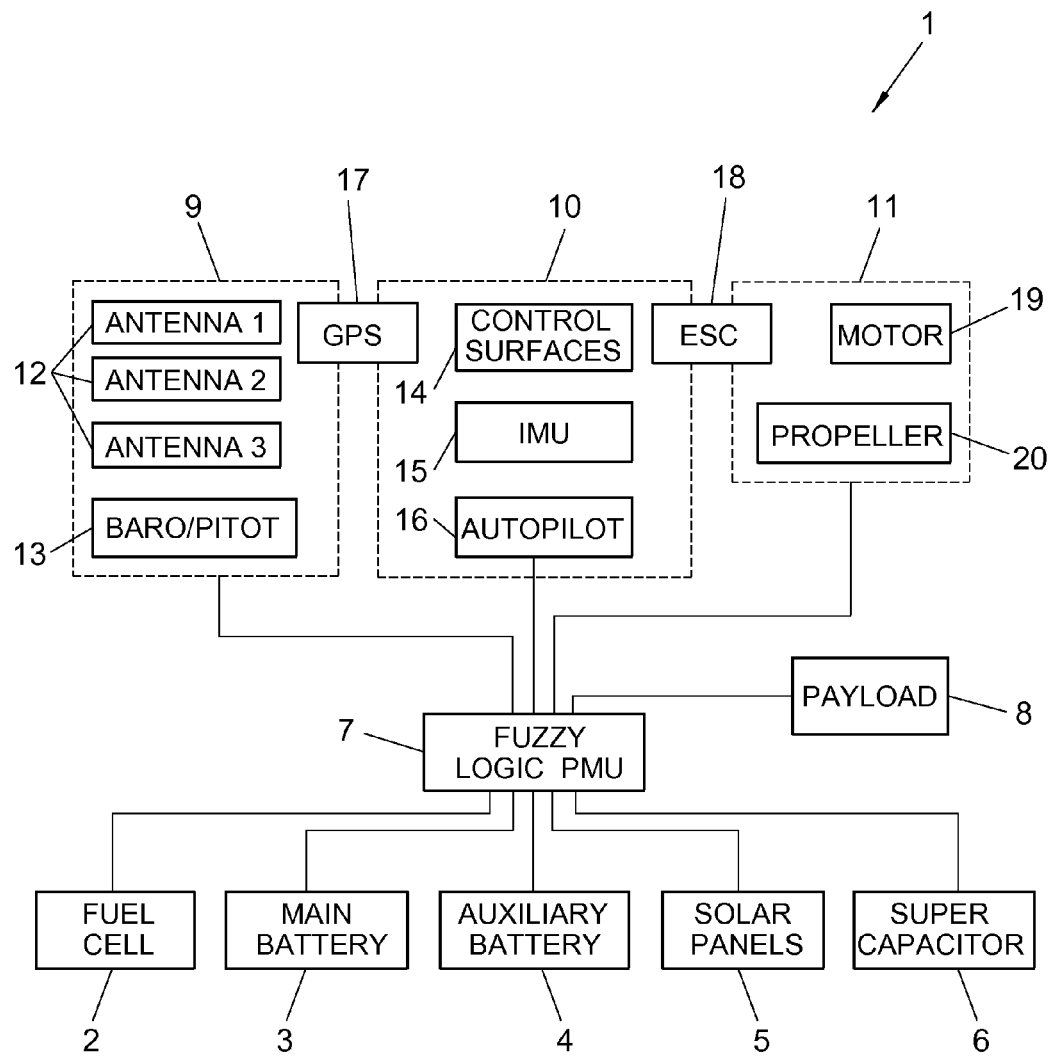
FIG. 1.—It shows a block diagram of a preferred embodiment of the power management system for unmanned air vehicles object of the present invention.

FIG. 1 shows the case scenario of an UAV (1) that features 5 different power sources. These power sources are:

Fuel Cell System (2): It possesses the greatest energy density of all but it cannot be recharged in flight. It only allows a slow discharge rate.

Batteries Main (3) & Aux (4): Lithium polymer batteries. They allow a fast discharge rate and can be recharged in flight.

Photovoltaic panels (5): Their capacity depends on the quantity of the received radiation. Other factors to consider are the orientation of the plane, season or cloudiness.

Fast discharge Supercapacitor (6): Payload oriented. It allows an ultra fast discharge rate and it can be recharged in flight.

It is important to consider that these power sources are a particular embodiment since the present invention could manage other different power sources such as a windmilling recovering system or similar.

The fuzzy logic power management unit (PMU) (7) delivers the correct amount of electric energy to every specific subsystem depending on the availability of energy and the mission profile and it will also manage the charging loop for the batteries (3,4) and the supercapacitor (6). In the case scenario of FIG. 1, there are 4 recipient subsystems: Payload (8), Instrumentation (9), Autopilot (10) and Propulsion (11). The Instrumentation subsystem (9) is composed by at least 3 antennas (12) and the Baro/pitot (13). The Autopilot subsystem (10) is composed by at least a control surfaces unit (14), an inertial measurement unit (IMU) (15) and the autopilot unit (16). Finally the propulsion subsystem (11) is formed by the motors (19) and the propellers (20).

The antenna system formed by the three antennas (12) takes the position of the plane (1) with respect to the ground station (or the satellite given the case) so a fuzzy approach can activate the specific antenna that will ensure a proper communication delivering the correct amount of energy to the desired antenna, thus ensuring a minimum loss of transmission packets while optimizing the energy consumption.

The system will use the GPS positioning system (17) combined with the airspeed and barometric altitude sensors (13) to optimize flight resources. Their combination will provide an estimation of the wind direction and intensity to the navigation subsystem of the aircraft and with that information, the autopilot subsystem (10) can adapt its speed/route informing the ground station about the changes. The autopilot subsystem (10) will adapt its speed, depending on the decisions making of the fuzzy logic PMU (7), by means of the electronic speed control system (18) of the UAV (1).

Also, if the mission requires radio silence over a certain area, the system will bring the transmission down depending on the fuzzy variable associated to the transmission hot areas. These transmission hot areas will be mission oriented fixed parameter introduced previously in the system.

A standard Power Management Unit would simply feed all the subsystems (8,9,10,11) and try to charge the main battery (3) while there is a surplus of energy (i.e., while the plane is gliding and the photovoltaic panels (5) are collecting energy). Although this solution is correct, the fuzzy logic PMU (7) proposed in this document can save a lot of energy by assigning priorities to the loads and the sources guided by a mission control.

Following, some simple examples of mission profiles in which the power management system and method object of the present invention could be useful, are described:

1. In the case of a mission that requires maximum endurance, the fuzzy logic PMU (7) monitors the state of charge of the main battery (3), the fuel consumed in the fuel cell (2) and the state of charge of the auxiliary battery (4), and whenever the main battery (3) is fully charged it will re-route the available energy to the main propulsion/control system (11), allowing the solar panels (5) to charge the auxiliary battery (4).

2. In the scenario of a mission where maximum speed is necessary, the fuzzy logic PMU (7) will derive all but the auxiliary battery (4) to the control/propulsion system (11), and the control system will manage incoming power by measuring airspeed, motor temperature and other external variables to determine the aircraft's maximum speed at that time.

3. In the case of a mission following waypoints, the fuzzy logic PMU (7) will use a mixed strategy to optimize the approach, calculating also in real time if the mission is feasible or not.

4. In the case of a compulsory high current payload delivery at certain coordinates, the fuzzy logic PMU (7) will store the necessary energy for the payload (8) and will apply energy optimization strategies depending on the other mission goals. Once the UAV has reached a predefined place at a predefined time (mission goal), the fuzzy logic PMU (7) would charge the Supercapacitor (6) and from there it would release the energy to the payload (8). This payload (8) might be a pulsed laser for example.

Figure 2:
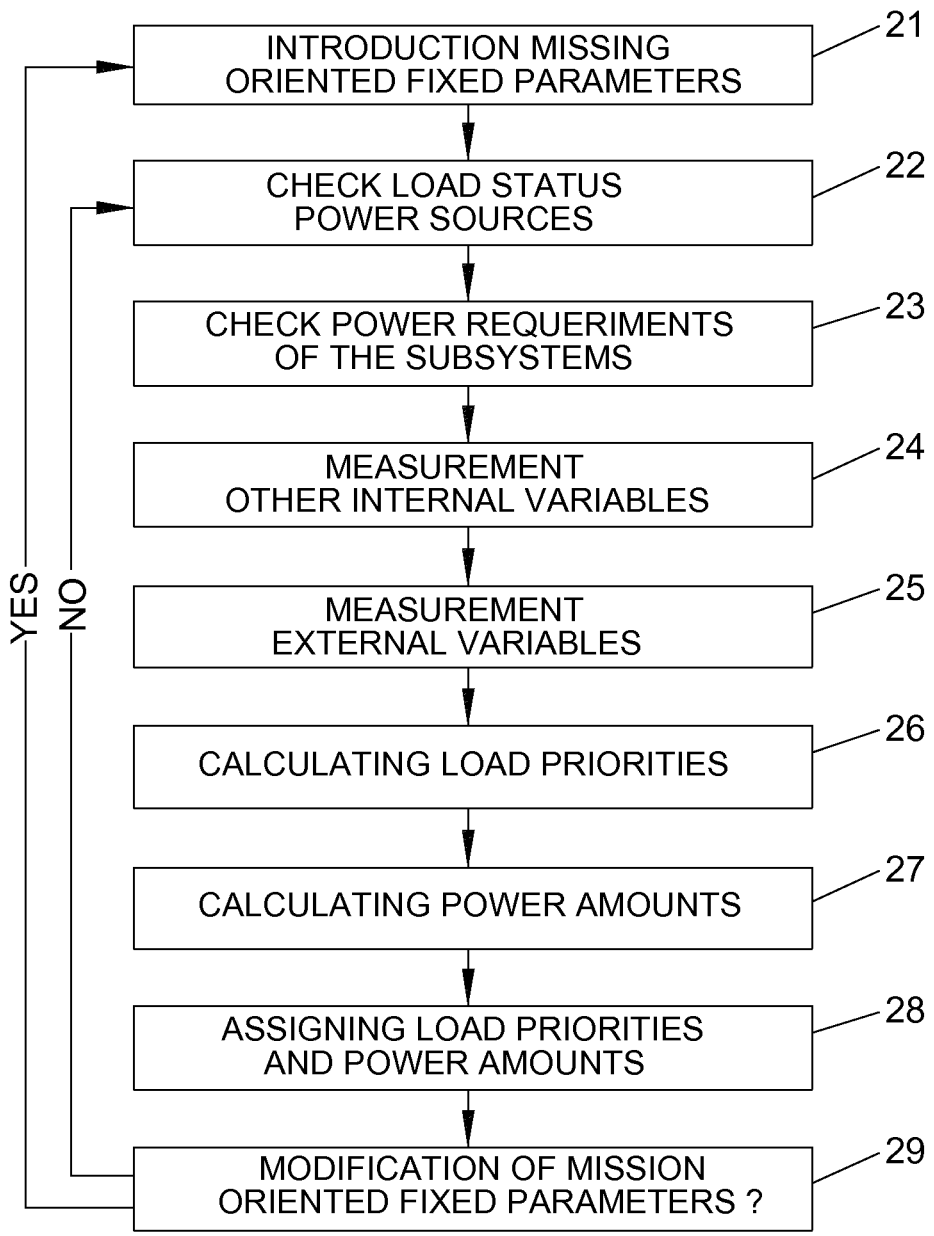
FIG. 2.—It shows a block diagram of a preferred embodiment of the power management method for unmanned air vehicles object of the present invention.

FIG. 2 shows a particular embodiment of the method object of the present invention. Firstly an operator introduces (21) in the system a set of predefined mission oriented fixed parameters such as, the distance to be traveled by the vehicle, flight speed, flight limits, goals and others. Secondly the system automatically would check (22) the load status of the different power sources (2-6) of the UAV (1) in order to have detailed information of the energy available in this moment in each one of the sources.

Thirdly the system automatically check (23) the energy requirements of each subsystem (8-11) in this moment and measure (24) other internal variables such as the motor temperature, etc. the system will also measure (25) external variables such as outside air temperature, airspeed and others. With the information of the mission oriented fixed parameters, the internal variables (including the load status and power requirements) and the external variable, the system automatically calculate (26), by means of a fuzzy logic power management unit (7), a set of priorities for delivering power to the subsystems (8-11), so the system evaluates which subsystems will be first or mainly provided with power and which subsystems will be secondly or secondarily provided with power.

Then the system calculates (27) a set of amounts of power delivered to each subsystem and a second set of priorities for deciding which one of the power sources (2-6) will deliver power to which subsystem (8-11). Then the system will assign (28) the sets of priorities and amounts to the subsystems and power sources.

Finally the system will check (29) if the mission oriented fixed parameters have been modified in a remote manner by the control personnel and will continue with the method in a loop until the end of the mission.

Figure 3:
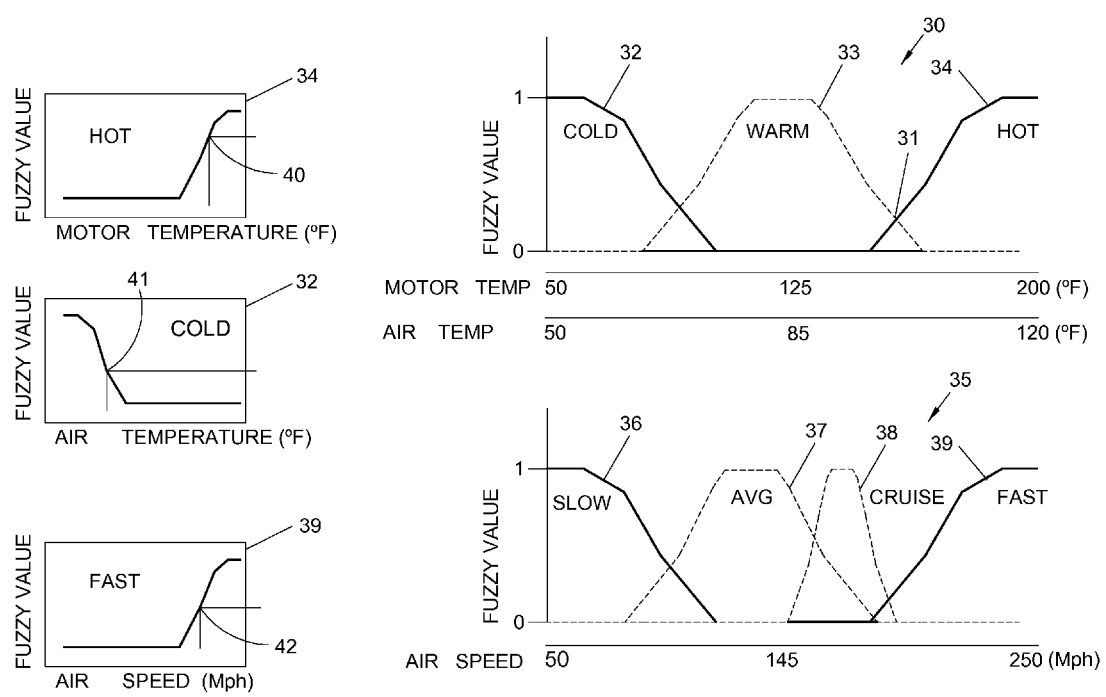
FIG. 3.—It shows a preferred embodiment of the fuzzy variables mapping and decisions for a particular case scenario.

FIG. 3 shows a particular embodiment of the fuzzy variables mapping and decision for a specific case scenario. This scenario corresponds with the second mission profile disclosed above in which maximum speed is necessary. In order to optimize the endurance or speed of the plane, the PMU also takes other external variables into account. The weight of these variables when compared to the others is the key to an optimal decision. Such external variables can be decisive even not being power-dependent. And for dealing with them, the preferred method would be a system that relies on Fuzzy Logic.

The graph (30) shows the profiles of the diffuse values corresponding to the variables "COLD", "WARM" and "HOT" regarding to the motor temperature and the air temperature (the air temperature is the temperature of the air at the entry of the motor). The maximum of the COLD profile (32) corresponds with the real value of 50° F. for the motor temperature and the air temperature. The maximum of the WARM profile (33) corresponds with the real value of 125° F. for the motor temperature and with the real value of 85° F. for the air temperature. The maximum of the HOT profile (34) corresponds with the real value of 200° F. for the motor temperature and with the real value of 120° F. for the air temperature. The points where the profiles of two variables cross, allow a user to evaluate at the same time, by means of the fuzzy logic, any of the two variables. For example, the point (31) where the HOT profile and the WARM profile crosses, can be used to evaluate equally how HOT is the motor or how WARM is the motor, all this by means of the fuzzy logic.

The graph (35) shows the profiles of the diffuse values corresponding to the variables "SLOW" (36), "AVG" (37), "CRUISE" (38) and "FAST" (39) regarding to the airspeed at the entry of the motor. The same reasoning that in the previous paragraph applies to this graph.

In the second mission profile, a human pilot is deciding whether to increase the speed of the UAV or not. The mission requires a fast approach to a target, but the motor temperature is high. It is assumed for this second mission profile that the maximum for the motor temperature must be 160° F., and according to the measure of the motor temperature sensor it is established that the fuzzy variable corresponding to the HOT profile of the motor temperature is 0.7 (40). So there is margin to increase the temperature of the motor until the temperature of the motor reaches its maximum. At the same time it is assumed that below the temperature value in which the variable evaluation is constantly 1, the air is considered as "absolutely cold" which disregards the motor cooling acceptance. In this particular embodiment of the invention, this absolutely cold temperature has been established in 18° F. According to the measure of the air temperature sensor it is established that the fuzzy variable corresponding to the COLD profile of the air temperature is 0.4 (41). Finally assuming that the desired speed of the UAV is 200 MPh, and according to the measure of the airspeed sensor it is established that the fuzzy variable corresponding to the FAST profile of the airspeed is 0.5 (40). So, there is margin to increase the speed of the UAV and therefore to increase the airspeed and therefore the motor cooling.

The thermal inertia of the motor suggests that it will take longer than usual to heat up even more, considering that the air intake is quite cold and it will result in a fast air cooling. So a pilot would have taken the decision of increasing the throttle actuator consequently.

On the contrary the system object of the present invention, by means of the fuzzy logic PMU (7), simplifies the decision taking using fuzziness:

ThrottleINCREASE(!motorHOT && airCOLD && speedFAST); (1−0.7) && 0.4 && 0.5=0.3

Then the fuzzy logic PMU, by calling of the function "ThrottleINCREASE" that considers the fuzzy variables "!motor HOT" (How NO-HOT the motor temperature is) corresponding to the fuzzy value (1−0.7), "airCOLD" (How COLD the air temperature is) corresponding to the fuzzy value 0.4 and "speedFAST" (How FAST the air speed is) corresponding to the fuzzy value 0.5, assigns power to the propulsion system and the autopilot increases the throttle consequently, about 0.3 points (30%) with respect to the throttle that the UAV has in this moment. The operator "&&" in fuzzy logic is equivalent to "AND" operator in Boolean logic.

This effortless and instantaneous handling of such many variables needs a prior careful programming depending on the number of subsystems of the aircraft and their complexity, but that needs to be done only once for each system and the programming will reduce the human factors influential on the task that needs to be accomplished.

The invention claimed is:

1. A power management method for an Unmanned Air Vehicle (UAV) for managing electrical power distribution to a plurality of subsystems onboard the UAV during performance of a mission, the method comprising:
receiving a set of mission oriented fixed parameters for implementing the mission of the UAV;
determining a current state of charge of a plurality of electrical power sources onboard the UAV;
determining current electrical power requirements of each of the subsystems onboard the UAV;
measuring a plurality of internal flight variables of the UAV;
measuring a plurality of external flight variables of the UAV;
calculating and assigning, utilizing a fuzzy logic algorithm, priorities for delivering electrical power to each of the subsystems onboard the UAV based on the current state of charge of the plurality of electrical power sources onboard the UAV, the current electrical power requirements of each of the subsystems onboard the UAV, the plurality of internal flight variables of the UAV, the plurality of external flight variables of the UAV, and the set of mission oriented fixed parameters for implementing the mission of the UAV;
calculating and assigning, utilizing the fuzzy logic algorithm, amounts of electrical power delivered to each of the subsystems onboard the UAV based on the current state of charge of the plurality of electrical power sources onboard the UAV, the current electrical power requirements of each of the subsystems onboard the UAV, the plurality of internal flight variables of the UAV, the plurality of external flight variables of the UAV, and the set of mission oriented fixed parameters for implementing the mission of the UAV;
deciding, utilizing the fuzzy logic algorithm, which of the plurality of electrical power sources deliver the electrical power to which of the subsystems onboard the UAV based on the current state of charge of the plurality of electrical power sources onboard the UAV, the current electrical power requirements of each of the subsystems onboard the UAV, the plurality of internal flight variables of the UAV, the plurality of external flight variables of the UAV, and the set of mission oriented fixed parameters for implementing the mission of the UAV; and
delivering the electrical power to the subsystems onboard the UAV based on the priorities calculated, the amounts of electrical power calculated, and which of the plurality of electrical power sources that deliver the electrical power to which of the subsystems onboard the UAV.

2. The method of claim 1 wherein the plurality of internal flight variables of the UAV are selected from a group comprising:
- an internal temperature of a propulsion system of the UAV;
- an availability of the electrical power sources onboard the UAV; or
- any combination thereof.

3. The method of claim 1 wherein the plurality external flight variables are selected from a group comprising an air speed of the UAV, an outside air temperature, an atmospheric pressure, or any combination thereof.

* * * * *